No. 651,135. Patented June 5, 1900.
P. H. DUDLEY.
INSTRUMENT FOR DETERMINING AMOUNT OF ELONGATION AND COMPRESSION OF RAILWAY RAILS UNDER MOVING TRAINS.
(Application filed Jan. 13, 1898.)
(No Model.) 2 Sheets—Sheet 1.
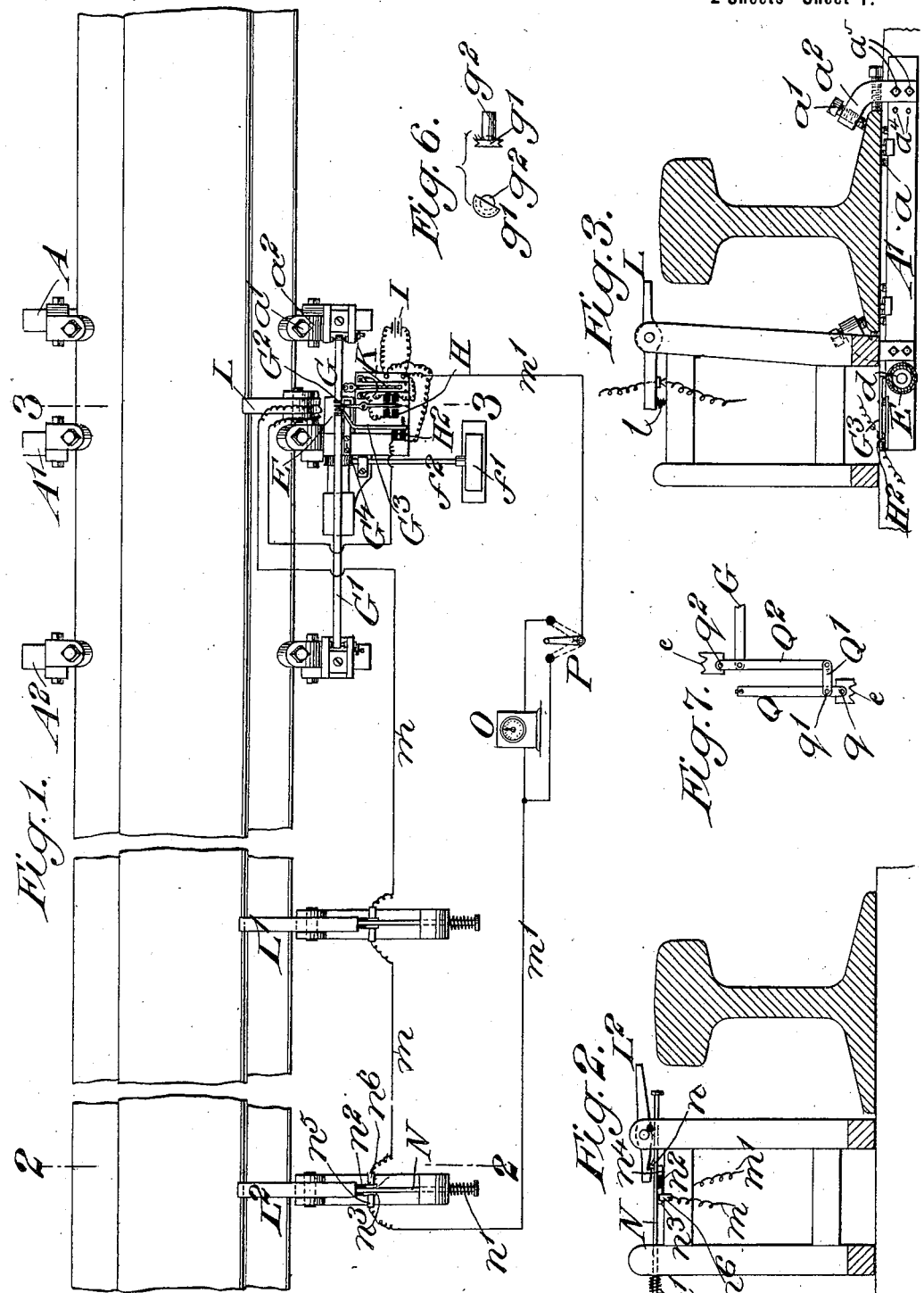

No. 651,135. Patented June 5, 1900.
P. H. DUDLEY.
INSTRUMENT FOR DETERMINING AMOUNT OF ELONGATION AND COMPRESSION OF RAILWAY RAILS UNDER MOVING TRAINS.
(Application filed Jan. 13, 1898.)
(No Model.) 2 Sheets—Sheet 2.
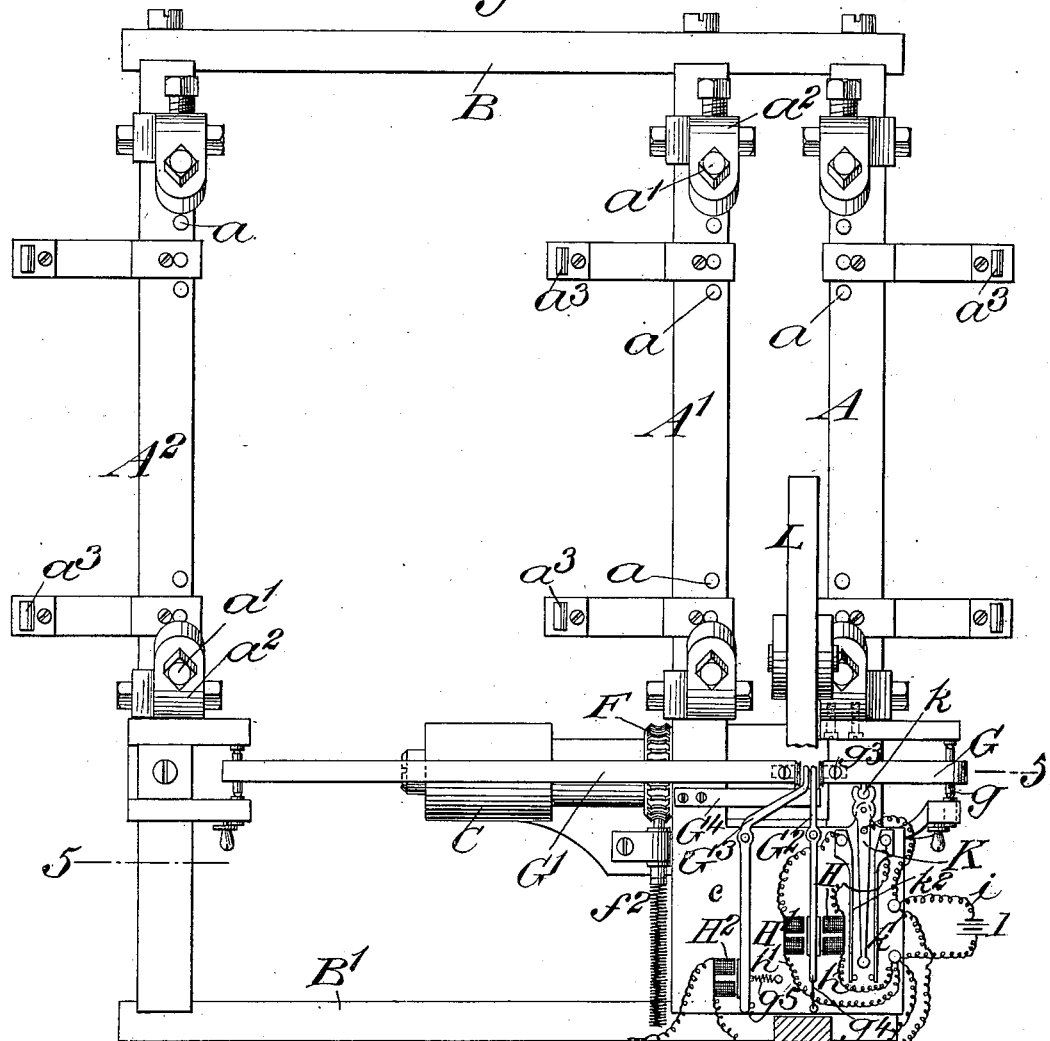
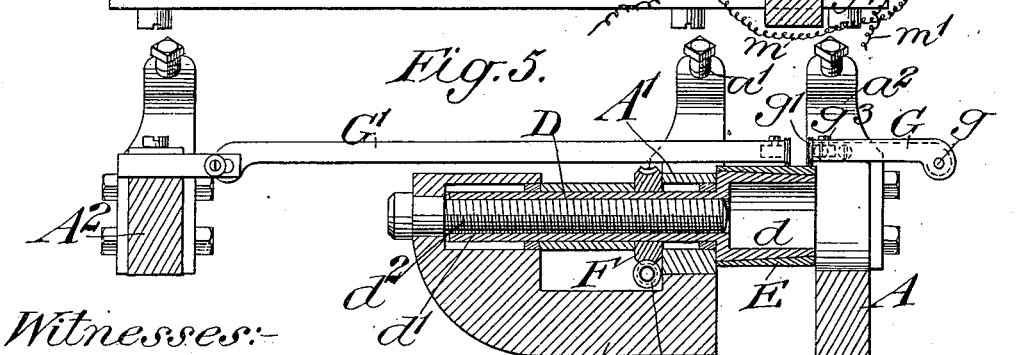

UNITED STATES PATENT OFFICE.

PLIMMON H. DUDLEY, OF NEW YORK, N. Y.

INSTRUMENT FOR DETERMINING AMOUNT OF ELONGATION AND COMPRESSION OF RAILWAY-RAILS UNDER MOVING TRAINS.

SPECIFICATION forming part of Letters Patent No. 651,135, dated June 5, 1900.

Application filed January 13, 1898. Serial No. 666,532. (No model.)

*To all whom it may concern:*

Be it known that I, PLIMMON H. DUDLEY, a citizen of the United States, and a resident of New York, in the county and State of New York, have invented a new and useful Instrument for Determining the Amount of Elongation and Compression of Railway-Rails Under Moving Trains, of which the following is a specification.

My invention relates to an instrument for determining the amount of elongation and compression of railway-rails under moving trains and contemplates mechanical means for making a record of such elongation and compression.

My invention further contemplates means for making auxiliary records to be read in connection with the aforesaid record of the elongation and compression, said auxiliary records indicating the moments when the rail was under elongation and when under compression, clearly distinguishing the one from the other, and also means for making a record of the instants when the different wheels of the moving train passed over the section of rail under test.

My invention further contemplates means for making a record which will indicate the speed of the train at the time of passing over the section of rail under test.

A practical embodiment of my invention is represented in the accompanying drawings, in which—

Figure 1 is a plan view showing the instrument in position for use and its connection with track-treadles for making certain of the records. Fig. 2 is a transverse section through the line 2 2 of Fig. 1. Fig. 3 is a transverse section through the line 3 3 of Fig. 1. Fig. 4 is a top plan view of the instrument full size. Fig. 5 is a vertical section of the same along the line 5 5 of Fig. 4. Fig. 6 is a view in detail of a preferred form of scriber, and Fig. 7 is a view in detail indicating means for multiplying the effect of the movement of the scriber-arm to enlarge the record.

The frame of the instrument conveniently consists of three bars $A$ $A'$ $A^2$, intended to occupy a position transversely to the rail and at such a distance apart as may be determined upon for the purposes in hand. In the present instance I have shown the bars $A$ $A'$ in the full-sized drawings, Figs. 4 and 5, spaced such a distance apart as to bring their points of contact with the base of the rail just one inch apart and the bars $A'$ $A^2$ so spaced as to bring their points of contact with the rail four inches apart for the purpose of securing at the same test the elongation and compression of a rail-section one inch in length and the elongation and compression of an adjacent rail-section four inches in length in order that an average deduction from the two records may be made and any possible error thereby reduced to a minimum.

In order to hold the bars $A$ $A'$ $A^2$ spaced the proper distance apart while they are being clamped to the rail, I provide spacing-bars $B$ $B'$, removably connected to the ends of the bars $A$ $A'$ $A^2$ in any well-known or suitable manner. The bars $B$ $B'$ are to be removed after the instrument has been adjusted to the rail.

In the plan view, Fig. 1, I have shown the relative spacing of the bars $A$ $A'$ $A^2$ in the ratio of one to two instead of one to four, as in the full-sized view, Fig. 4, and I wish it to be understood that this spacing is a matter of choice and convenience rather than of necessity and, furthermore, that a single space between two of the bars would be sufficient to secure a record and that the additional greater or lesser space is provided for, for the sole purpose of correcting possible error and not as a necessary feature.

The upper faces of the bars $A$ $A'$ $A^2$ are provided with hardened points $a$ for entering the base of the rail to hold the bars accurately and securely in their spaced positions, and clamping-screws $a'$, working in overhanging arms $a^2$, are utilized to force the bearing-points $a$ into the base of the rail by forcing the base of the rail down onto the points.

Provision may conveniently be made for clamping the instrument to rail-bases of different widths by making one set of overhanging arms $a^3$ adjustable along the bars—for example, by providing extra holes $a^4$ in the bars $A$ $A'$ (see Fig. 3) for the reception of the bolts $a^5$—and providing additional points $a$ at suitable intervals, if necessary.

In order to limit the extent to which the points $a$ shall be permitted to enter the base of the rail, I provide bearing-rollers $a^3$, on which the base of the rail will rest when the point has been inserted the proper depth and on which the base of the rail beyond the limits of the instrument will be permitted to travel freely, so as not to disturb the effect of the elongation and compression of the rail-section within the limits of the instrument upon the record-making devices.

To one of the bars, in the present instance to the bar A', there is secured a supporting-bracket C, in which a hollow spindle D has a bearing, the said hollow spindle D also having a bearing in the bar A', through which it extends toward the bar A. The spindle D is provided with a tapering head $d$, arranged to receive an annular plate E, on which the record is or the several records are to be made. The bearings for the spindle D are made as accurate as may be and so located that the record-receiving face of the annular plate E may have its uppermost element of surface at all times in the same horizontal plane with the lower face of the base of the rail. The record-receiving plate E may be slid off the spindle-head for the purpose of examination and for the purpose of introducing new record-receiving plates as often as may be required.

It is intended that the spindle D shall rotate continuously during the time the record is being made, and for the purpose of making the record continuous throughout a greater distance than simply the circumference of the plate I provide for simultaneously rotating the spindle and bodily advancing it, thereby causing the record-line to follow a spiral path along the face of the receiving-plate. To this end the spindle D is provided with a worm-wheel F, secured thereon by a feather-and-groove connection, which worm-wheel is driven by a worm $f$, actuated by a motor shown conveniently at $f'$ and connected with the worm $f$ by a shaft $f^2$.

The interior of the hollow spindle D is provided with a fine screw-thread $d'$, which engages an exteriorly-screw-threaded stud or core $d^2$, fixed to the bracket C and extending along the interior of the spindle D. As the spindle is turned by the worm-wheel it will be forced bodily forward by its engagement with the screw-threaded stud $d^2$, and hence the record-making needle or scriber, held normally in a fixed position relatively to the record-receiving plate, will be caused to follow a spiral path along the plate.

A scriber-arm G is pivotally secured to a suitable support on the bar A, the center of its pivotal connection $g$ being in the horizontal plane of the base of the rail and extends thence toward the top of the plate E, its free end being provided with a scriber $g'$, consisting, preferably, of a semicircular disk having a stem $g^2$, fitted to be inserted in a socket in the end of the scriber-arm G and secured therein in removable adjustment by means of a set-screw $g^3$. This structure of the scriber is advantageous, in that it affords a stiff point in contact with the record-receiving plate, which point will not be liable to break under the jar of a passing train and which may be kept sharp by grinding the edge of the disk. A second scriber-arm G' is in like manner pivoted to the bar $A^2$ and extends thence over the top of the record-receiving plate E to within a short distance of the free end of the arm G, its free end, like that of the arm G, being provided with a scriber for recording the elongation and compression which take place in the rail-section between the bars A' and $A^2$. The space between the free ends of the scriber-arms G G' or between the scribers at the ends of said arms is intended to be just sufficient to permit the introduction between them of two auxiliary scribers $G^2$ $G^3$, for the purpose to be hereinafter more fully explained. Provision is also made for drawing a reference-line on the record-receiving plate by means of an arm $G^4$, fixed to the bracket C or bar A', as may be found most convenient, and carrying at its free end a scriber—such, for example, as the needle N in my Patent No. 628,928, granted July 18, 1899—in position to form a continuous line intermediate of the lines formed by the scribers carried by the arms G G'.

For the purpose of making a record to show positively which of the abnormal lines produced by the scribers on the arms G G' were made when the metal of the rail was under stress tending to elongate it and which were made when the rail was under stress tending to compress it, I provide the scriber-arm $G^2$, the scriber of which is intended to engage the record-receiving plate in alinement with the scribers on the arms G G' and intermediate thereof. The scriber-arm $G^2$ is arranged to be swung laterally with respect to the path of the record around the receiving-plate by means of electromagnets H and H', located upon opposite sides of the scriber-arm, the latter being provided on its opposite sides with armatures subject to attraction by the said magnets. The electromagnets H and H' are in circuit with a battery I and with a circuit maker and breaker under the control of one of the scriber-arms—in the present instance under the control of the scriber-arm G—as follows: The circuit maker and breaker consists of a pivoted arm K having a loose connection at one end with a ball-stud $k$ on the side of the arm G, and at its opposite end having a vibratory movement between two yielding contact-plates $k'$ $k^2$, one of them, $k'$, being in electric communication with one pole of the electromagnet H and the other, $k^2$, being electrically connected with the corresponding pole of the electromagnet H'. The opposite poles of the electromagnets H and H' are connected by wires $h$ $h'$ with one pole of the battery I, the opposite pole of the battery I being electrically connected at all times with the circuit maker and breaker K by means of a wire $i$. The parts denoted by $G^2$ $G^3$ K H H' $H^2$ $k'$ $k^2$ $g^4$ $g^5$ and the connecting-wires are conveniently attached to a plate $c$, fixed to the supporting-bracket C. From this arrangement it follows that when the scriber-arm G is moved in one direction—for example, toward the bar A', as it will be when the base of the rail is compressed—it will rock the circuit-maker K into electrical contact with the contact-plate $k'$ and the circuit will be complete through the electromagnet H, thereby drawing the scriber-arm $G^2$ toward it and the scriber itself carried by the arm $G^2$ off to one side of its normal position, where it will make its record so long as the metal in the base of the rail under test is compressed. The moment, however, the base of the rail is elongated, as when the wheel of the passing train is bearing on the section under test, the scriber-arm G will be moved in the opposite direction and will swing the circuit-maker K over into contact with the piece $k^2$, thereby breaking the circuit through the electromagnet H and completing the circuit through the magnet H', and hence drawing the scriber-arm $G^2$ in the opposite direction, and the scriber carried thereby will immediately describe a transverse line from its former position across its normal position to the opposite side of its normal line and there will remain so long as the metal in the rail is elongated. When the metal of the rail returns to normal, the scriber-arm G will return the circuit-maker K to its normal position intermediate of and out of contact with both the pieces $k'$ $k^2$, and the scriber-arm $G^2$ will, by means of a spring $g^4$, having its free end loosely engaged in a slot in the end of the said arm $G^2$, be returned to its normal position between the magnets H H', where its scriber will again follow the normal line.

The scriber carried by the arm $G^2$ may be made to reverse the positions of its record for compression and record for elongation by simply changing the wires leading from the circuit-maker K to the poles of the magnets H H' from the one magnet to the other.

The scriber carried by the arm $G^3$ is caused to make a record which will determine both the speed of the train and the particular wheel of the moving train which was on the section of rail being tested at the moment of any transverse or abnormal movement of the scriber carried by the arm G or G', or both, which is accomplished as follows: The scriber-arm $G^3$ carries an armature of an electromagnet $H^2$, which when energized holds the armature, and hence the scriber-arm, toward the magnet against the tension of the scriber-arm-actuating spring $g^5$, which spring tends to draw the arm $G^3$ away from the magnet whenever the magnet is deënergized. The magnet $H^2$ is in circuit with the battery I and with several track-treadles, in the present instance three, as follows: One of the track-treadles (denoted by L) is located adjacent to the rail at a point as nearly central as may be of the rail-section under test. It consists simply of a pivoted arm held normally by a spring $l$ in position to close the circuit in the wire $m$, leading from one pole of the battery I through the electromagnet $H^2$, so that as each wheel of the passing train engages the treadle L it will break circuit momentarily, permitting the scriber-arm $G^3$ to swing away from the magnet $H^2$; but the moment the wheel passes the circuit will again be closed and the scriber-arm will be drawn back toward the magnet $H^2$.

At a convenient distance along the track from the treadle L in that direction from which the train is supposed to be approaching the instrument a second track-treadle L' is located and is constructed to momentarily break circuit in the wire $m$ and again close the circuit under the impulse of the pilot-wheel of the locomotive, the arrangement being such that the further passing of the wheels of the moving train will not affect it. A simple and convenient structure for this purpose is represented in the drawings, in which the treadle which the wheel engages is in the form of a pivoted latch which catches over an abutment $n$ on a longitudinally-sliding bar N, the latter being under the influence of a spring $n'$, tending to slide it the moment it is released by the latch-treadle L'. The sliding bar N carries a circuit making and breaking piece consisting of an insulating-section $n^2$, in proximity to the ends of which there are circuit-making sections $n^3 n^4$. This circuit making and breaking piece is arranged to slide between two yielding contact-pieces $n^5$ $n^6$, interposed in the wire $m$, so that when the treadle L' is depressed by the pilot-wheel of the locomotive the bar N in sliding longitudinally under the tension of its actuating-spring will during its movement interpose between the contact-pieces $n^5$ $n^6$ the insulating-section $n^2$ and will thereby momentarily break the circuit, deënergizing the magnet $H^2$ and permitting the scriber-arm $G^3$ to vibrate as before. This break, however, will be but momentary, as the circuit will again be complete by the interposing of the circuit-making section at the end of the insulating-section between the contact-pieces $n^5 n^6$. The bar N, having once been released, is no longer affected by the vibratory movement of the treadle L' under the impulse of the succeeding wheels of the train.

At a predetermined distance from the treadle L' there is located a similar treadle $L^2$. This distance is preferably forty-four or eighty-eight feet for the purpose of easy computation, and it may be found desirable to locate the treadle L' a corresponding distance from the treadle L in order that the space on the record between the vibrations of the scriber-arm G as the train reaches the treadle $L^2$ and L' may be repeated as the train reaches the treadles L' and L. From one of the contact-pieces at the treadle $L^2$ the wire $m'$ returns to the opposite pole of the battery I to complete the circuit. There is further interposed in the circuit through the track-treadles a clock O, arranged for convenience to beat seconds and to make and break the circuit at each swing of the pendulum. The clock O may be switched into and out of circuit at pleasure by means of a switch P.

In practice, the instrument having been applied to the rail to be tested and the parts adjusted in position for making the record, the observer as the train approaches and a sufficient time before it reaches the treadle L² will set the receiving-plate of the instrument in motion and will switch the clock O into circuit, causing a series of spaces to be recorded on the receiving-plate by the scriber-arm G³ corresponding to seconds of time. Just before the train reaches the treadle L² the clock will be switched out of circuit and the pilot-wheels of the locomotive operating the treadles L² and L' will, as above described, produce a record spaced on the receiving-plate corresponding to a distance of eighty-eight feet or whatever the distance may be between the treadles L² and L'. A comparison of the second-spaces recorded on the plate with the space corresponding to eighty-eight feet or any predetermined number of feet will enable the observer to determine the speed of the train at the time it is passing. As the successive wheels pass the treadle L they will make a succession of records—one for each wheel that passes—and these records will be made simultaneously with the records of elongation and compression of the section under test, so that by noticing the record of the greatest elongation or compression and noting the relation which the wheel-record opposite this record of greatest elongation and compression bears to the first wheel-record the observer may determine just what wheel was over or adjacent to the rail-section under test at the moment this record of greatest elongation or compression was made.

If it be desired to multiply the effect of the scriber-arm G or G', one or both, the scriber may be carried by an auxiliary arm Q, pivoted at $q$ to the plate $c$ or to a projection thereof and loosely connected by a link Q', pivoted at $q'$ with an arm Q², pivoted at $q²$ to the plate $c$ or to a projection thereof and loosely connected with the scriber-arm G, the connection of the arm G with the arm Q' being nearer its fulcrum than the point where the link is connected with it and the link being connected with the arm Q at a point nearer than the point where the scriber is located, the scriber being still in alinement with the axis of the arm G.

It is obvious that one or more of the auxiliary records which have been hereinabove described may be made in connection with the primary record at pleasure and that changes in the form and arrangement of the parts may be resorted to without departing from the spirit and scope of my invention. Hence I do not wish to limit myself strictly to the structure herein set forth; but

What I claim is—

1. An instrument for testing rails under moving trains comprising means for attaching the instrument to the rail at one side of the neutral axis of the rail to segregate a plurality of portions of the rail to be tested in combination with scribers connected to move in accord with the elongations and compressions of the said segregated portions of the rail at that side of the rail where the instrument is attached and a record-receiving mechanism common to said scribers, substantially as set forth.

2. An instrument for testing rails under moving trains comprising means for attaching the instrument to the rail at one side of the neutral axis of the rail to segregate a portion of the rail to be tested in combination with means for automatically making a continuous record of the amount of elongation and compression of that side of the rail where the instrument is attached, said recording mechanism including a cylindrical record-receiver and means for moving the record-receiver simultaneously in different directions, substantially as set forth.

3. The combination with a scriber, a record-receiver and means for securing them in position to record the elongation and compression of the rail, of a second scriber and means under the control of the first-named scriber for operating the second-named scriber to distinguish the record of elongation from that of compression, substantially as set forth.

4. The combination with a scriber, a record-receiver and means for securing them in position to record the elongation and compression of a rail, of a second scriber, electromagnets for operating the second scriber, an electric circuit including a source of electric energy for energizing the magnets and a circuit maker and breaker under the control of the first-named scriber to operate the second scriber to distinguish the record of compression from that of elongation, substantially as set forth.

5. The combination with a scriber, a record-receiver and means for securing them to a rail to record the elongation and compression of the rail, of a second scriber, an electromagnet for operating the scriber, an electric circuit including a source of electric energy for energizing the magnet and a track-treadle located in the neighborhood of said recording mechanism for making and breaking the circuit to operate the second scriber and thereby indicate the particular wheel of the passing train corresponding to any particular record of elongation or compression of the rail, substantially as set forth.

6. The combination with mechanism for recording the elongation and compression of a rail under a moving train, of a scriber arranged to operate in connection with the aforesaid mechanism, an electric circuit including a source of electric energy for operating the said scriber, track-treadles located at a predetermined distance apart along the track for interrupting the electric circuit and a clock interposed in said circuit for interrupting the circuit at predetermined intervals of time whereby the said scriber is caused to make a record to determine the speed of the passing train, substantially as set forth.

7. The combination with recording mechanism for determining the elongation and compression of the rail, of auxiliary scribers working in connection with said recording mechanism, means for causing one of the said auxiliary scribers to distinguish the record of compression from that of elongation and for causing another to make a record of speed of the passing train and of the particular wheel of the passing train corresponding to a particular record of elongation or compression, substantially as set forth.

In testimony that I claim the foregoing as my invention I have signed my name, in presence of two witnesses, this 6th day of January, 1898.

PLIMMON H. DUDLEY.

Witnesses:
FREDK. HAYNES,
ROBERT B. SEWARD.